(12) United States Patent
Burger

(10) Patent No.: US 6,219,439 B1
(45) Date of Patent: Apr. 17, 2001

(54) BIOMETRIC AUTHENTICATION SYSTEM

(76) Inventor: Paul M. Burger, 12 Kiwanis Dr., Wayne, NJ (US) 07470

( * ) Notice: Subject to any disclaimer, the term of this patent is extended or adjusted under 35 U.S.C. 154(b) by 0 days.

(21) Appl. No.: 09/350,771

(22) Filed: Jul. 9, 1999

Related U.S. Application Data

(60) Provisional application No. 60/092,196, filed on Jul. 9, 1998.

(51) Int. Cl.$^7$ ....................................................... G06K 9/00
(52) U.S. Cl. ........................... 382/115; 382/116; 382/124; 235/382; 235/380
(58) Field of Search ..................................... 382/115, 116, 382/125, 124; 340/825.34; 235/380, 382; 356/71; 902/3–5

(56) References Cited

U.S. PATENT DOCUMENTS

| | | | |
|---|---|---|---|
| 4,783,823 | * 11/1988 | Tasaki et al. | 382/116 |
| 4,821,118 | 4/1989 | Lafreniere . | |
| 4,993,068 | 2/1991 | Piosenka et al. . | |
| 5,473,144 | * 12/1995 | Mathurin, Jr. | 235/380 |
| 5,594,806 | 1/1997 | Colbert . | |
| 5,680,205 | 10/1997 | Borza . | |
| 5,717,776 | 2/1998 | Watanabe . | |
| 5,787,186 | 7/1998 | Schroeder . | |
| 5,793,881 | 8/1998 | Stiver et al. . | |
| 5,815,252 | 9/1998 | Price-Francis . | |
| 5,825,005 | * 10/1998 | Behnke | 235/380 |
| 5,862,247 | 1/1999 | Fisun et al. . | |
| 5,920,640 | * 7/1999 | Salatino et al. | 235/380 |

OTHER PUBLICATIONS

Identity, New Dimensions to an Old Problem, Roundtree, D., I.D. World, Mar./Apr. 1999, pp. 19–29.
NEC Adds Fingerprint Solution to GSA Sked, Adams, C., Federal Computer Wk, Apr. 5, 1999.
Fingerprint ID Systems Point to Increased Security, Speir, M., Federal Computer Week, Mar. 29, 1999.
Biometric Devices Key to the Future of Access Control Systems, Overbeck, A., Security Systems News, Apr. 1999.
Smart Cards Seem a Sure Bet, Leung, A., InfoWorld, Mar. 8, 1999, pp. 39–40.
Smart Cards, How It Works; ELP, May 1999, p. 222, Wihte, R. How Computers Work, 4$^{th}$ ed., published by Que.
About Smart Cards, Cagliostro, C, Smart Card, www–scia.org/aboutsc/stand.html., Jul. 7, 1999.
Press Releases on Biopass, May 27, 1999, Biometric ID Inc. and Gemplus to Deliver First Stand–Alone, Contactless Smart Card System with Secure Fingerprint Identification.
Biometric Security Corp. Profile, May 30, 1999, Fingerprinted, Com/Pres. HTML.
Authentec Press Release, Apr. 19, 1999, PR Newswire.

* cited by examiner

Primary Examiner—Bhavesh Mehta
(74) Attorney, Agent, or Firm—Weingram & Associates, P.C.

(57) ABSTRACT

A biometric authentication system is provided which includes a dual input reader, the inputs consisting of stored physiological data of a user on a chip disposed on a smart card, and a fingerprint scan for comparison against the stored data. The system is self-contained so that the comparison of the biometric data with the data stored on the chip is done immediately on board the reader without relying upon communications to or from an external source in order to authenticate the user. The invention also prevents communication with external sources prior to user authentication being confirmed, so as to prevent user data from being stolen or corrupted. Alternatively, the biometric input can consist of a retina scan, voice identification, saliva or other biometric data.

14 Claims, 2 Drawing Sheets

BIOMETRIC AUTHENTICATION SYSTEM

CROSS REFERENCE TO RELATED APPLICATIONS

This application is related to and claims the benefit of U.S. provisional Application No. 60/092,196 filed Jul. 9, 1998.

BACKGROUND OF THE INVENTION

1. Field of the Invention

The present invention relates to apparatus and systems which input one or a plurality of a person's physical characteristics for comparison with stored data to authenticate the identity of an individual.

2. Description of the Prior Art

Apparatus are known which use biometrics for security procedures, identification, access control, and such apparatus are disclosed in the following patents:

| U.S. Pat. No. | Inventor(s) |
| --- | --- |
| 4,821,118 | Lafreniere |
| 4,993,068 | Piosenka et al. |
| 5,594,806 | Colbert |
| 5,680,205 | Borza |
| 5,717,776 | Watanabe |
| 5,787,186 | Schroeder |
| 5,793,881 | Stiver et al. |
| 5,815,252 | Price-Francis |
| 5,862,247 | Fisun et al. |

U.S. Pat. No. 4,821,118 to Lafreniere discloses a video image system for personal identification consisting of observing a unique part of the person's anatomy along with the person's ID card and appearance and storing images of those observations for review and comparison with other records.

U.S. Pat. No. 4,993,068 to Piosenka et al. discloses an unforgeable personal identification system consisting of a portable memory device (credit card size) on which are stored identification credentials such as facial photo, retina scan, voice and fingerprints. At a remote access control site, the user presents the portable memory device and the encrypted identification credentials and then submits physically to imputing the physical identification characteristics, e.g. fingerprints, whereby comparisons performed to determine whether to allow or deny access to a remote site.

U.S. Pat. No. 5,594,806 to Colbert discloses a knuckle profile identification system in which a user inserts an ID card to retrieve the template from the card of his knuckle profile for comparison against the actual knuckle profile.

U.S. Pat. No. 5,680,205 to Borza discloses a fingerprint imaging apparatus with auxiliary lens.

U.S. Pat. No. 5,717,776 to Watanebe discloses a certification card producing apparatus and certification card consisting of an input for an identification number of an old identification card, including a retina image of an owner, and an eyesight test means for judging whether the owner is genuine by collating the old retina image and the present retina image supplied.

U.S. Pat. No. 5,787,186 to Schroeder discloses a biometric security process for authenticating identity and credit cards, visas, passports and facial recognition, consisting of an identity card where pre-printed colored ink filigrees and the face images have been transferred by a procedure onto the card. The holder of the card is then scanned or videoed. The facial image can then be transmitted on conventional telecommunication lines to a remote computer which reconstructs the initial face image.

U.S. Pat. No. 5,793,881 to Stiver et al. discloses an identification system consisting of a detection object which is grasped by a hand for detecting characteristics of the hand and comparing the unique characteristics of those previously recorded and stored in memory. The object can be a handle at a secure facility or even a weapon.

In many of the known security systems, a user must correctly enter both an assigned user ID number and a password. This is frustrating for both users and systems support personnel. There is also an increase in total costs of system ownership and maintenance. Many of the companies employing such systems permit the user identification number assigned to the last user logged onto a particular personal computer (PC) to be a default entry in the user ID entry field. This is the default configuration setting which, for example, the Windows 98 and Windows NT install in such systems. This is a major security breach of such systems. In addition, the user must remember both his ID and password and in many instances, the user has a plurality of ID's and passwords for different systems. For example, a distinct ID number and password are used for network access, for data base access, for E-mail, for main frames, etc. Keying in all this data provides for an increased opportunity for another individual to observe the passwords being entered to breach the system. In addition, "hackers" can "sniff" a network wire and capture un-encrypted passwords. In more sophisticated theft situations, "trojan horse" type viruses can be used to capture a user ID number and password that have been entered. That is, the user thinks he is logging on as usual, but the dialogue he is entering this information into is really a look-alike type log on screen that is capturing his key strokes.

The foregoing description of some of the known systems shows the weakness and vulnerability such systems have to being corrupted and compromised.

Among other systems, some of which are disclosed in the patents discussed above, a user may provide a biometric finger print to a reader device to be compared against data on a smart card to also be inserted into the device. This type of system requires the user to enter his user ID and password and provide his finger for a finger print scanner. The image of the finger print is then transmitted to the server along with a scanned image of the finger that was placed on the scanner and verified to be a match. If there is a match, the log on process will proceed as normal with the validation of the user ID and password. However, the information is still being communicated to a server and therefore, the potential for compromising system security is increased, as was discussed above. Since these readers provide no first level authentication prior to sending any data out over the wire whether to the locally connected PC or over the LAN (local area network), there is an increased potential for security risk to the system.

The systems described above are "polling-type systems". The known systems continuously monitor card readers that are attached to the particular PC to see if an identity card has been inserted. The constant querying of the readers requires a lot of computer and mechanical support of the host PC. This in turn requires a significant amount of PC central processing unit (CPU) time and physical memory in order for the system to function. In today's corporate world, a server PC that communicates with tens or perhaps hundreds of readers, requires a significant overhead, which is why systems available now use a dedicated PC for these functions. In other words, a desk top PC which has one reader attached will lose a lot of valuable CPU cycles and memory while continually asking or polling the reader if a card is inserted.

However, the apparatus and systems disclosed above call for comparing input data for identification against a multiplicity of data from perhaps as many as millions of individuals. The systems above also transceive information, whether by wire or wirelessly, to remote locations which permits unauthorized access to or theft of the information that is transmitted or received.

For example, a criminal (hacker) could try to defeat or compromise an ID card in much the same way as described in the "trojan horse" example. That is, a fake component is not the log on screen but the reader itself. A criminal could install a "look-alike" reader as an ATM for example. A cardholder then inserts his card into this fake reader. If communication were allowed to the reader prior to authentication, the hacker could then attempt to read from or "pull" information from the card, such as in this example, the card holder's fingerprint template, this live scan of their fingerprint, their bank account(s) numbers, as well as all other confidential information on the card. Additionally, the hacker could infect the card with a virus that would then be propagated to other systems the cardholder would later access.

In contrast, the present invention provides for an open, stand-alone system which does not waste valuable PC memory and CPU cycles and does not communicate with external sources so as to prevent theft of user's information.

It would therefore be desirable to have an authentication system and apparatus which only initiates a one-to-one comparison with biometrics of a single user against stored data on an identification card, so that the system is not required to review information from a multiplicity of other persons and be vulnerable to theft.

It is also desirable to have an authentication apparatus and system that does not require communication with a remote location or external source, whether transmitted by wire or wirelessly, to authenticate the individual or the identity.

It is also desirable to have a reader for the system as a stand-alone component where no communications are permitted into or out of the reader until a positive authentication occurs. This greatly enhances the security of the system and network from unauthorized access.

OBJECTS AND SUMMARY OF THE INVENTION

It is an object of the present invention to provide a biometric authentication apparatus and system, each of which can be integrated into existing software systems, such as Microsoft Windows NT.

It is an object of the present invention to provide an authentication system which is stand-alone and is designed to authenticate an individual by comparing a biometric characteristic of the individual with data stored on a storage medium such as a smart card.

It is another object of the present invention to provide an authentication system which is self-contained, thereby preventing the necessity for communication with a remote location.

It is another object of the present invention to provide an authentication system which prevents "hacking" or other unauthorized access to the authentication process and data.

It is another object of the present invention to provide an authentication system which compares stored biometric data with a biometric characteristic of a user in a portable, stand-alone unit.

The smart access system of the present invention as disclosed is a biometric-based personal authentication system, in particular, a dual input authentication system, wherein one of the inputs is biometrically-based, while the other input is biometric data on a template for a computer chip stored on a smart card.

Another embodiment of the invention includes three inputs to authenticate a user, i.e. stored biometric data, stored identification data, and a sensed biometric feature.

Another feature of the invention is that it is self-contained, portable, and in that regard, does not rely on communications with a remote location for authentication to be implemented.

The invention provides a biometrics apparatus to authenticate the cardholder. In summary, the unit is a stand-alone unit and can be hand-held. Wireless operation to a remote database is avoided because this would permit unauthorized users to hack or "sniff" data transmitted between the apparatus and the remote database. The hand-held unit or wall mounted unit has a port into which a user inserts his smart card, such as a MAC-like card having the necessary cross-referencing data stored thereon. The individual then touches a platen to disclose a fingerprint to the device. The fingerprint is extracted and sensed, and if it corresponds with the data on the card, authentication of the individual is confirmed. Alternatively, retina scan, voice identification, saliva, DNA, or other biometrics may be used instead of the fingerprint.

The invention is a biometrics authentication device which is preferably portable, hand-held and stand-alone, not relying upon a remote database and requires a plurality of inputs in order to authenticate the user. Application would be in the security system industry, Internet security, and is applicable anywhere authentication is required. For example, the device could be connected to a computer of a purchaser to authenticate same to a seller before the seller on the Internet releases the product for service.

BRIEF DESCRIPTION OF THE DRAWINGS

Other important objects and features of the invention will be apparent from the following Detailed Description of the Invention taken in connection with the accompanying drawings of which.

DETAILED DESCRIPTION OF THE INVENTION

Figure 1:
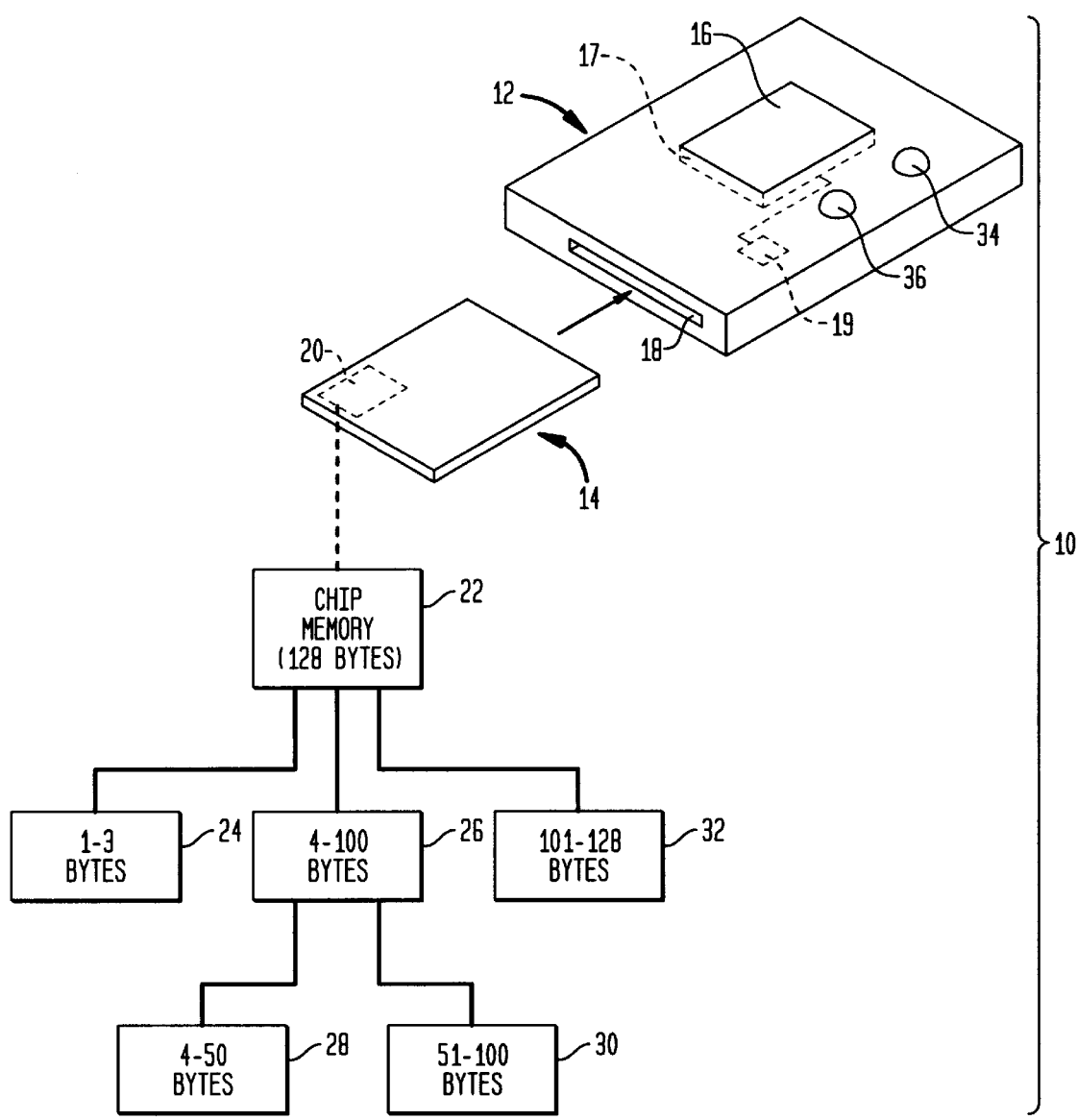
FIG. 1 discloses a smart card and reader of a biometric authentication system according to the present invention.

Referring to FIG. 1, there is shown generally at 10 a reader 12 for a "smart card" 14 used in a biometric authentication system (FIG. 2) according to the present invention. The "smart card" 14 is any one of a number of cards which meet certain electronic and storage data capacity requirements as required by the following standard: ISO 7816 series, part 1-10 for contact smart cards, and ISO 14443 for contactless cards. The smart card is a credit card sized plastic card with an embedded computer chip. The chip can either be a microprocessor with internal memory, or a memory chip with non-programmable logic. The chip connection is either via direct physical contact or remotely via contactless electromagnetic interface. A contactless system requires antennas and is therefore, a less reliable system.

The reader 12 is a self contained stand-alone unit, which can be of any size. Preferably, the reader 12 is sized and shaped for a hand held operation. The reader 12 includes a fingerprint scanner platen 16 wired to internal circuitry (not shown) of the reader 12. The platen 16 is actually an exterior surface of a semi-conductor chip 17 constructed to extract biometric data, such as a fingerprint and scan the data as well. The chip 17 is preferably a silicone chip. A comparison means (chip) 19 includes a control means (chip) and is connected to the chip 17. The comparison chip compares the data and biometric features of the user. The control chip controls communications at the reader so that information about the user is not released to an external source before user authentication is confirmed. Similarly, the control chip prevents incoming signals or data transmissions from reaching the reader 12 before user authentication is confirmed. An input 18 is provided in the reader 12 into which the smart card 14 is removably inserted.

The smart card 14 is of the size and shape of a credit card and includes a chip 20 having a select amount of memory therein. The smart card 14 can include other chips (not shown), as well as other data corresponding to the user.

The chip 20, by way of example, includes 128 BYTES of memory, shown generally at 22. Of this total chip memory 22, 1 to 3 BYTES shown generally at 24 can be used for system operation. User information 26 can be stored in the chip memory 22. The user information 26 can include, for example, 4 to 100 BYTES of memory which are broken down as follows: fingerprint memory 28 can consist of 4 to 50 BYTES of memory, while identification data 30 representing the user can require 51 to 75 BYTES of memory. The remaining memory 32 can be for other system operations. It is understood that this description of the memory for the chip is for example purposes only and is not a required parameter.

The self-contained, stand-alone features of these elements 10 according to the present invention are ideally suited for authenticating an individual carrying the smart card 14. For example, the smart card 14 could operate as a driver's license having the chip 20 with memory 22 therein. A police officer selecting an individual for discussion could seek authentication of the individual prior to such discussion. The police officer would carry the reader 12 requesting the user to put his smart card 14 in the input 18 of the reader 12. The user then places his finger on the fingerprint scanner 16, which is the silicone chip 17, for comparison with the fingerprint data stored in the chip memory 22 to determine whether the person carrying the card is the same person as that whose finger is resting on the scanner 16. If authentication is confirmed to be positive, a visual indicator 34 will light. Authentication is done at the scene, on board the reader 12, not at a remote location. If it is determined that the data at the fingerprint scanner 16 does not correspond to that which is stored in the chip memory 22, an indicator 36 will be lit. Other visual indicators may also be used to indicate transmissions and receptions of data, after authentication of the user is positively confirmed. Alternatively, an audible indicator can be used in conjunction with the visual indicators 34, 36.

The comparison of the fingerprint scanned at the scanner 16 with the data on the chip 20 of the smart card 14 is done immediately on board the reader 12. There is no communication, whether by wire or wirelessly, to or from a remote location central processing unit (CPU) or any other device for authentication. No information is permitted into the reader during the comparison step. This obviates the need for encumbering the on-site authentication with unnecessary data in the CPU and prevents hacking or sniffing of the information being compared.

Figure 2:
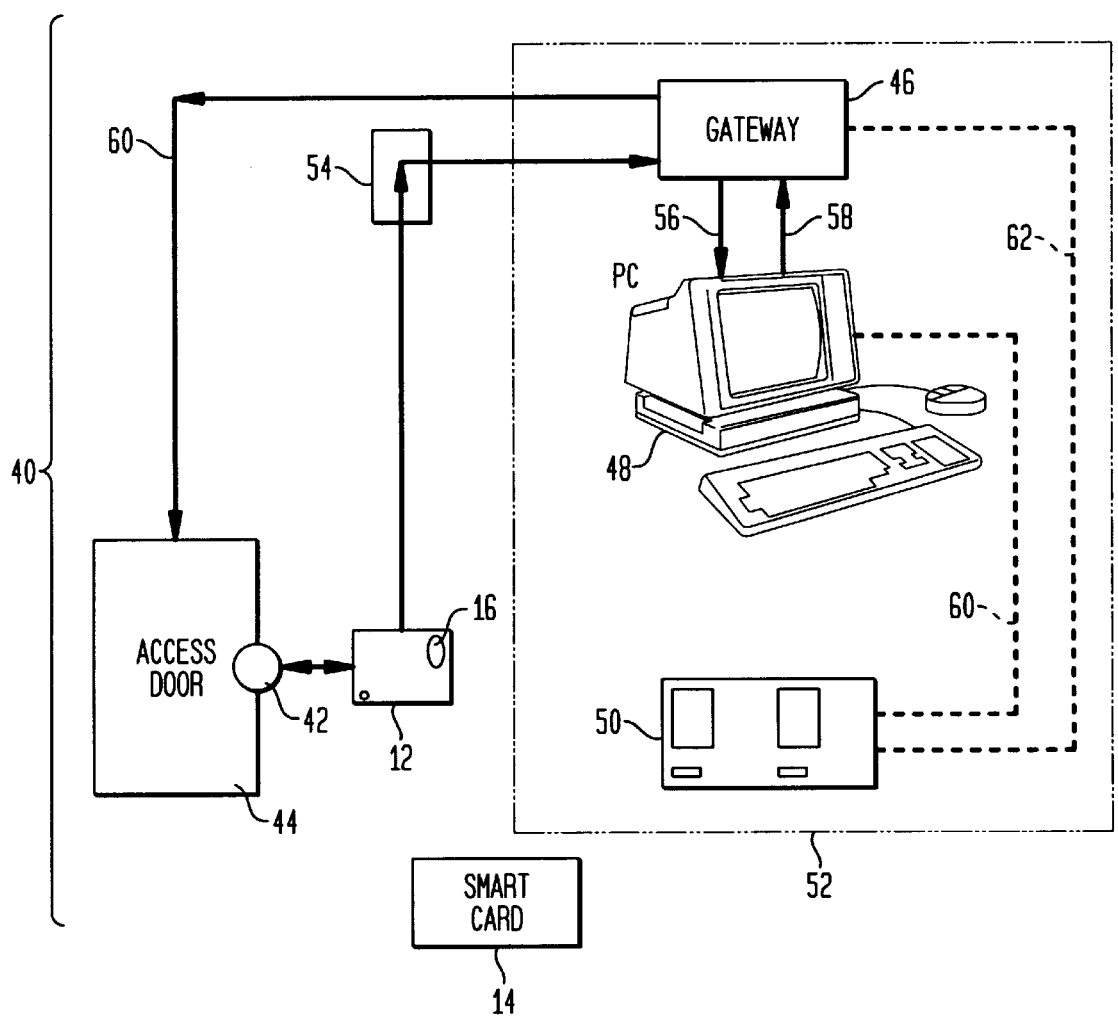
FIG. 2 discloses a diagram of the biometric authentication system of the present invention used for, for example, in a security situation.

Referring also to FIG. 2, the elements 10 are shown used in a biometric authentication system 40 of the present invention. In FIG. 2, the present system 40 is shown used in a security access environment. The system 40 can be used in other environments as well.

The system 40 includes the reader 12, which as discussed above, scans the user's fingerprint and compares it against the stored template of the same print on the smart card 14. The smart card 14 includes on-board the micro computer chip 20 to allow for downloading of PC data and applications. The Smart Card 14 is removably inserted in the reader 12 which is connected to a magnetic strike lock 42 of a security access door 44. Although one access door 44 is shown for the system 40, it is understood that there can be a multiplicity of doors controlled and monitored by the system 40. A gateway 46 is in communication with the reader 12, and routes the information to a PC 48. Other mechanisms (hardware) can be used to route the data through the system 40. The PC-server can operate, for example, either Windows 98 or Windows NT. An uninterrupted power supply (UPS) 50 is connected to the PC 48 and the gateway 46 to provide complete backup power and surge surpresor capability. The UPS 50 can communicate with the system PC 48 to signal changes in the power environment so that the end users and support personnel can be alerted to such power changes.

The broken line 52 represents a cabinet which can be used to contain the gateway 46, the PC 48 and the UPS 50. The cabinet 52 can itself be locked to prevent unauthorized access thereto.

In operation, referring to FIG. 2, a user attempts to gain access through the door 44 by inserting their card 14 into the reader 12 so that the stored template of their fingerprint can be read from the card 14 for the authentication process. The user then places his or her finger on the fingerprint scanner 16. The reader 12 then scans the actual fingerprint and then compares the image of the finger obtained with that of the stored data for the fingerprint template in the chip memory 22. If the fingerprint scanned matches the data in the chip memory 22, then and only then will the user's information and identification be sent to the gateway 46 for transmission to the PC 48 to determine if the user is permitted to enter through the access door and gain entry. Similarly, no communication into the reader 12 is permitted before the user is actually authenticated. The reader 12 can be mounted on the door 44 or on a wall adjacent to the door. It is important to note that authentication is done at the reader 12, not at the gateway 46 or the PC 48. Authentication at the PC 48 via the gateway 46 exposes the system to a security breach, because it permits unauthorized hacking or sniffing of the data that is transmitted. Therefore, the system provides an immediate on-board and on-site authentication of the user before any data corresponding to the user is transmitted to a remote location for entry through the door 44 or access to other areas. In addition, until authentication of the user is actually confirmed, no communications are received at the reader 12. This further prevents the opportunity for those unauthorized to access information about the user or obtain the stored data.

Once the user is authenticated as discussed above, the user information which is encrypted on the card 14 is transmitted to a domain controller 54. The controller 54 receives this information and determines if the user has the necessary clearance on a network for the system 40 to gain entry through the door 44 that is connected to the reader 12. Many different rules can be applied to a particular user that can be checked and verified once the data is received by controller 54. For example, user profiles can be configured so that certain people can only enter on certain days at certain times through this particular door 44, or other doors or objects as the situation requires.

The data from the reader 12 is then transmitted to the gateway 46 and then forwarded to the appropriate computer. Since most PC's, such as the PC 48 of the present system 40, have only two communication ports and, it is possible that a plurality perhaps hundreds of doors in a building have to be connected to this system 40, the gateway 46 is needed to monitor these connections and pass the data through to the PC 48 once data is received from any one of the doors, such as the door 44. The gateway 46 obviates the need for the PC 48 to have a communication port for each one of the doors in the system 40. An inbound connector 56, and in an out-bound RS232 cable 58 are shown connecting the gateway 46 with the PC 48.

Data received at the gateway 46 is routed to the in-bound cable 46 of the PC 48.

Once the data is received at the PC 48 that is operating the system 40, system rules are checked, evaluated, and based upon the status of the rule (either true or false), a determination is made which processing will then take place. There are a number of different rules that may, or may not be checked and acted upon. This all depends on the system and the requirements of the user to access or be denied access certain spaces in the facility. Once the user is authenticated as discussed above, the system 40 either allows or denies access to the door 44 or whatever other object is to be acted upon. Other rules can be acted upon, such as simply logging on, logging off, accounts being disabled, monitored, etc. At this stage in the system 40, activity can also be set up as "alerts" so that if a particular condition exists with respect to the rules, notification of support and management personnel can be automatically actuated to alert such personnel of the particular event occurring.

Once the data has been processed and it is determined that user access is authorized, or that user access is not authorized to the door 44 based on one or more of the answers to the rules testing, the accessed "authorized" or "denied" response is transmitted from the PC 48 through the out-bound RS232 cable 58 to the gateway 46.

The RS cables 56, 58 are referred to by example only. Other cable constructions can be used.

The data received at the gateway 46 from the PC 48 in the previous step is transmitted to the specific reader 12\door 44. The gateway 46 determines from which reader 12 the request originated and for which an answer is now available and must be transmitted. Since there could be hundreds of doors connected to the gateway 46, it is important that the gateway 46 undertake this step of the system process.

The gateway 46 then automatically transmits the door 44\reader 12 request through the correct port and transmission line 60. The data is then on its way back to the respective reader 12\door 44 which upon arrival will either grant or deny the user access to the door 44.

The data response is then received at the reader 12, and thereafter, the user will hear either the unlocking noise thus permitting the user access through the door 44, or "access denied" message on an LCD or visual indicator read out of the reader 12. Access by the user could be denied for a plurality of reasons based upon the rules that are encoded with the PC 48 of the system 40. In addition, a record of this and all activity with respect to the user and his or her trying to obtain access to this door 44 and other sites will be recorded and logged for print out and archive capability at the system PC 48.

The UPS 50 is connected to the PC 48 as shown by the dotted line 60, and into the gateway 46 by the dotted line 62. The UPS 50 provides, for example, automatic voltage regulation, built-in network card\modem surge protection and battery management to extend battery life and increase run time and line interaction.

The present invention will provide many advantages and applicability for personal and commercial use. For example, the elements 10 in system 40 can be used with the television (TV), thereby restricting viewing of the television based upon: time of day, channel selection, viewer age, and pay-per-view shows. The present system would replace the ATM card for banking use, thereby authenticating the user at the ATM machine before any data, transmission or banking activity occurs. With respect to automobiles, the elements 10 or the system 40 can provide for a contact less reader 12 installed at the exterior of the car to unlock the car and in addition, a similar system can be also mounted to the dash board to control use of the steering wheel. At the doctors office, you would present your card 14 into the reader 12 to automatically verify you are the individual who is to be seen by the physician and to verify insurance or other medical information necessary for a medical procedure or office visit to continue. Charges, such as co-payments can also be monitored and authenticated.

The present invention will enable a company to discontinue use of the conventional employee identification card, security card system, health benefits and prescription plan cards and the need to distribute metal keys that can be lost, duplicated or stolen. In the present invention, even if the user's card 14 is stolen, there is no way for another to use the card because the fingerprint of the other individual would not match the data stored on the chip 20 of the card.

There are a multiplicity of ways in which the elements 10 in system 40 of the present invention can be employed.

The present invention is designed to be compatible with Windows 95\98 and NT 4.0\5.0, as well as other operating systems.

Modifications of the foregoing may be made without departing from the spirit and scope of the invention. What is desired to be protected by Letters Patent is set forth in the appended claims.

What is claimed is:

1. A biometric authentication apparatus, comprising:
   a smart card having:
      a computer chip storing data corresponding to a biometric feature of a card user, the smartcard adapted for providing the biometric feature data for comparison to the biometric feature of the card user,
      a non-biometric identifier corresponding to the card user; and
   a portable reader having:
      a housing, the housing having an inlet constructed and arranged for releasably receiving the smart card at the housing,
      a biometric scanner mounted to the housing and accessible to the biometric feature of the card user, a central processing unit (CPU) mounted to the housing, the CPU adapted for comparing at the portable reader the biometric feature at the scanner with the biometric feature data stored on the computer chip of the smart card for generating a first comparison signal representing the authentication status of the card user, and for providing a second comparison when the first comparison signal indicates positive authentication of the user, the second comparison between the non-biometric identifier of the smart card and other user data stored remote from the smart card to further determine authentication status of the user and generate a second comparison signal;

a control chip associated with the CPU at the portable reader, the control chip preventing communication with the authentication apparatus until positive authentication of the user is complete; and an indicator assembly adapted for receiving the first and second comparison signals generated to indicate the authentication status of the card user.

2. A method of authenticating a user, the method comprising the steps of:

storing biometric data of the user on a storage means;

sensing a biometric feature of the user at a sensing means;

comparing the biometric feature of the user sensed with the biometric data stored;

determining whether the biometric data stored is representative of the biometric feature sensed;

wherein the step of storing biometric data further comprises the steps of:

storing personal identifying data of the user other than the biometric data of the user on the storage means, storing other personal identifying data of the user other than biometric data of the user remote from the storage means, and comparing the personal identifying data on the storage means with the other personal identifying data remote from the storage means;

controlling information about the biometric data and biometric feature of the user to be restricted from external communications until the determining step positively authenticates the user;

indicating a result of the determining step to indicate authentication status of a user.

3. An authentication apparatus, comprising:

storage means for storing data corresponding to a biometric feature of a user;

sensor means separate and discrete from the storage means for sensing the biometric feature of a user;

reader means for reading the biometric feature sensed and being in communication with the storage means and the sensor means;

comparison means associated with the reader means for comparing the biometric feature sensed with the storage means data of the biometric feature for determining at the reader means authetication status of the user and generating a signal of said status;

control means associated with the comparison means at the reader means, the control means adapted for receiving the authentication status signal and controlling communication with the authentication apparatus to be restricted until said status signal indicates positive authentication of the user; and indicator means connected to the comparison means for receiving the status signal generated to indicate the status of user authentication.

4. An authentication apparatus, comprising:

storage means for storing biometric data of a user; and reader means for reading a biometric feature of a user, the reader means coacting with the storage means for reading the biometric data at the reader means and generating a signal representing a result of a comparison of the biometric data with the biometric feature of the user to determine authentication status of the user; and control means in communication with the reader means for controlling access to the biometric data and the biometric feature of the usr to be restricted to the reader means until positive authentication of the user.

5. The authentication apparatus according to claim 4, wherein the control means restricts access to the biometric data and the biometric feature of the user to the reader means.

6. The authentication apparatus according to claim 4, wherein the storage means comprises:

a plastic card with a computer chip having a central processing unit (CPU) embedded therein, the chip storing the biometric data of the user.

7. The authentication apparatus according to claim 6, wherein the plastic card is a smart card.

8. The authentication apparatus according to claim 4, wherein the reader means comprises:

a silicon chip mounted to the reader means, the silicon chip having a surface area accessible to the user at an exterior of the reader means for receiving the biometric feature of the user.

9. The authentication apparatus according to claim 4, wherein the reader means comprises:

an optical scanner.

10. The authentication apparatus according to claim 4, wherein the reader means comprises:

an inlet constructed and arranged to releasably receive the storage means.

11. The authentication apparatus according to claim 4, further comprising:

indicator means connected to the reader means for indicating status of user identification resulting from the comparison by the reader means.

12. The authentication apparatus according to claim 11, wherein the indicator means is selected from the group consisting of visual indicators, audible indicators, or a combination thereof.

13. The authentication apparatus according to claim 4, further comprising:

identifier means stored on the storage means, the identifier means corresponding to personal identifying data of the user other than biometric features of the user;

wherein the reader means is adapted to compare the personal identifying data of the identifier means with the biometric feature data of the user and the biometric feature sensed of the user.

14. The authentication apparatus according to claim 4, wherein the biometric feature is selected from a group consisting of a fingerprint, saliva, retian scan, and voice scan.

* * * * *